United States Patent
LeMieux et al.

(10) Patent No.: US 7,322,794 B2
(45) Date of Patent: Jan. 29, 2008

(54) METHOD AND APPARATUS FOR CONDITION-BASED MONITORING OF WIND TURBINE COMPONENTS

(75) Inventors: David L. LeMieux, Boulder, MT (US); Emil M Moroz, San Diego, CA (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 11/218,358

(22) Filed: Sep. 2, 2005

(65) Prior Publication Data

US 2006/0070435 A1   Apr. 6, 2006

Related U.S. Application Data

(63) Continuation-in-part of application No. 10/620,485, filed on Jul. 15, 2003, now Pat. No. 7,004,724, and a continuation-in-part of application No. 10/357,522, filed on Feb. 3, 2003.

(51) Int. Cl.
  *G01M 19/00*   (2006.01)
(52) U.S. Cl. ............................ 416/40; 416/41; 416/61; 415/118
(58) Field of Classification Search .................. 416/40, 416/41, 43, 44, 61; 415/118, 26, 49, 48; 290/44, 55
See application file for complete search history.

(56) References Cited

U.S. PATENT DOCUMENTS

| | | | |
|---|---|---|---|
| 4,160,170 A * | 7/1979 | Harner et al. .................. 290/44 |
| 4,297,076 A * | 10/1981 | Donham et al. ............... 416/37 |
| 4,298,313 A | 11/1981 | Hohenemser | |
| 4,316,096 A * | 2/1982 | Syverson ...................... 290/44 |
| 4,331,881 A * | 5/1982 | Soderholm et al. ........... 290/44 |
| 4,420,692 A * | 12/1983 | Kos et al. ..................... 290/44 |
| 4,435,647 A | 3/1984 | Harner et al. | |
| 4,495,423 A | 1/1985 | Rogers | |
| 4,613,762 A | 9/1986 | Soderholm | |
| 5,140,856 A | 8/1992 | Larsen | |
| 5,225,712 A | 7/1993 | Erdman | |
| 6,361,275 B1 | 3/2002 | Wobben | |
| 6,940,186 B2 | 9/2005 | Weitkamp | |

FOREIGN PATENT DOCUMENTS

WO   WO-01/33075   5/2001

OTHER PUBLICATIONS

Caselitz, P et al., "Reduction of Fatigue Loads on Wind Energy Converters by Advanced Control Methods," European Wind Energy Conference, Dublin Castle, Ireland, (Oct. 1997), pp. 1-4.

(Continued)

*Primary Examiner*—Igor Kershteyn
(74) *Attorney, Agent, or Firm*—Blakely, Sokoloff, Taylor & Zafman LLP

(57) ABSTRACT

Condition-based monitoring functionality using sensors that monitor wind turbine component movement. A main shaft flange displacement sensor system can be used to provide signals used to perform fatigue assessment of the wind turbine rotor blades as well as drive train components. Output signals from the main shaft flange displacement sensor system are used to perform fatigue assessment, failure trending, diagnostic analysis, etc.

20 Claims, 11 Drawing Sheets

OTHER PUBLICATIONS

Kelley, Neil et al., "The NREL Large-Scale Turbine Inflow and Response Experiment—Preliminary Results," National Wind Technology Center, National Renewable Energy Laboratory, (2002), pp. 412-426.

LeMieux, David L., "Rotor Blade Fatigue Reduction on Wind Turbines Using Pitch Control," A Thesis submitted to the Department of General Engineering, Montana Tech of the University of Montana, Butte, Montana, USA, (May 2001) pp. i-109.

* cited by examiner

METHOD AND APPARATUS FOR CONDITION-BASED MONITORING OF WIND TURBINE COMPONENTS

RELATED APPLICATIONS

The present U.S. Patent application is a continuation-in-part of the following U.S. Patent applications, which are incorporated by reference herein:

1) U.S. patent application Ser. No. 10/357,522 filed Feb. 3, 2003 by Kirk D. Pierce and David L. LeMieux entitled "WIND TURBINE ROTOR LOAD CONTROL BASED ON COMPONENT DISPLACEMENT"; and 2) U.S. patent application Ser. No. 10/620,485 filed Jul. 15, 2003 now U.S. Pat. No. 7,004,724 by Kirk D. Pierce, David L. LeMieux and Ralph W. Blakemore entitled "METHOD AND APPARATUS FOR WIND TURBINE ROTOR LOAD CONTROL BASED ON SHAFT RADIAL DISPLACEMENT".

TECHNICAL FIELD

The invention relates to wind turbine generators. More particularly, the invention relates to condition monitoring of wind turbine components.

BACKGROUND

Utility grade wind turbines (i.e., wind turbines designed to provide electrical power to a utility grid) can have large rotors (e.g., 30 or more meters in diameter). Asymmetric loading across these rotors occurs due to vertical and horizontal wind shears, yaw misalignment and turbulence. These asymmetric loads contribute to extreme loads and the quantity of fatigue cycles on the rotor blades and other wind turbine components.

As a result of these extreme loads and fatigue cycles, components of the wind turbines have a limited useful life and must be replaced. The condition of various wind turbine components are currently monitored using sensors designed for condition monitoring. Techniques and devices used for monitoring of wind turbine components are generally referred to a "condition-based monitoring" (CBM) techniques and devices. An overview of CBM techniques can be found in a document entitled "Wind Turbine Operation & Maintenance based on Condition Monitoring WT-Ω" by T. W. Verbruggen published by ECN Wind Energy, April 2003 (document number ECN-C-03-047).

Two of the more common CBM techniques are vibration-based monitoring and fluid-based monitoring. Vibration-based monitoring analyzes measured vibration of one or more components to estimate the condition and/or performance of wind turbine components. In a typical vibration-based monitoring system, position transducers are used for low frequency monitoring, velocity sensors are used for middle frequency monitoring, accelerometers are used for high frequency monitoring and spectral emitted energy (SEE) sensors are used for very high frequency monitoring. Thus, a typical-vibration monitoring system includes multiple types of sensors with multiple monitoring algorithms, which can be complex and costly.

Fluid-based monitoring typically involves taking samples of fluids, for example, hydraulic oil or lubrication oil, for analysis to determine whether a component has experienced excessive wear. However, fluid-based monitoring provides only limited information related to the condition of wind turbine components. Thus, existing condition based monitoring systems are complex and/or provide limited information.

SUMMARY

A wind turbine includes a sensor coupled to detect movement of a wind turbine component from a base position and to generate one or more signals indicating the movement. A control circuit is coupled with the sensor to receive the one or more signals indicating the movement, to perform a condition-based monitoring operation based on the one or more signals and to selectively generate an output signal based on the condition-based monitoring operation.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

The techniques described herein support condition-based monitoring functionality using sensors that monitor wind turbine component movement. For example, a main shaft flange displacement sensor system can be used to provide signals used to perform fatigue assessment of the wind turbine rotor blades as well as drive train components. Because the sensor systems described herein are robust and require relatively low maintenance, the resulting condition-based monitoring (CBM) system is relatively low in cost compared to prior art systems. In one embodiment, output signals from the main shaft flange displacement sensor system are used to perform fatigue assessment, failure trending, diagnostic analysis, etc. Other sensor systems can also be used for condition based monitoring functions.

Figure 1:
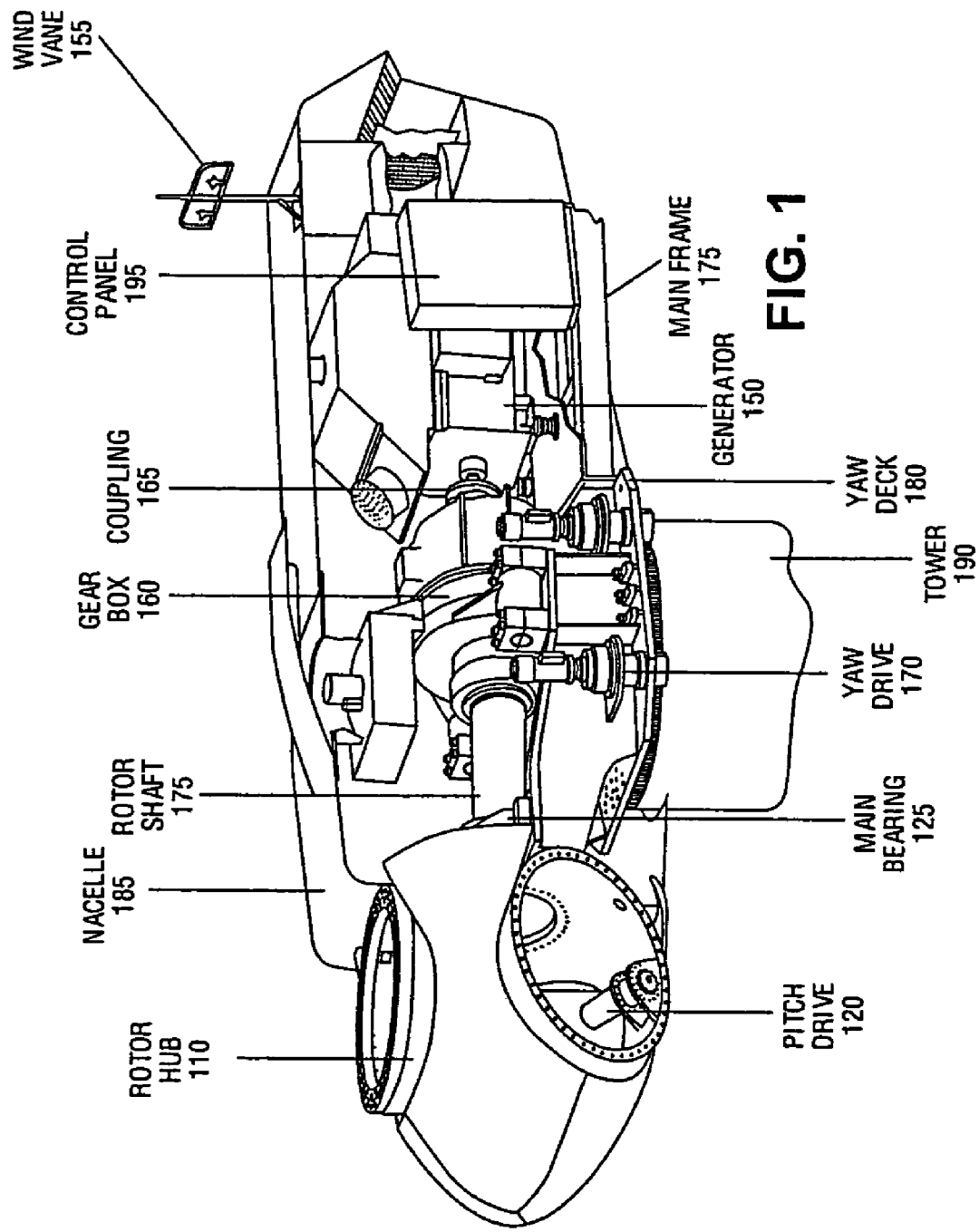
FIG. 1 is one embodiment of wind turbine components.

FIG. 1 is one embodiment of wind turbine components. The components of FIG. 1, except for hub 110, are housed in nacelle 185 atop tower 190. The height of tower 190 can be selected based on factors and conditions known in the art. In one embodiment, multiple microcontrollers (e.g., within control panel 195) are used for overall system monitoring and control including, for example, pitch and speed regulation, high-speed shaft and yaw brake application, yaw and pump motor application and fault monitoring. Alternative distributed or centralized control architectures can also be used.

In one embodiment, the control system provides control signals to variable blade pitch controller 120 to control the pitch of blades (not shown in FIG. 1) that drive hub 110 as a result of wind. In one embodiment, hub 110 receives three blades; however, any number of blades can be used. Hub 110 and the turbine blades combine to form a wind turbine rotor.

The drive train of the wind turbine includes rotor shaft 175 connected to hub 110 and gear box 160 that is used to drive generator 150. In one embodiment, rotor torque is transmitted through coupling 165. Any type of generator, for example, a wound rotor induction generator can be used in the wind turbine of FIG. 1. Yaw drive 170 and yaw deck 180 provide a yaw orientation system for the wind turbine. In one embodiment, the yaw system is electrically monitored and controlled by the control system based on information received from wind vane 155 mounted on nacelle 185.

As described in greater detail below, one or more proximity sensors are positioned to detect a deflection of main shaft 175 from a base, at-rest position. Using data from the sensors a turbine controller (or other computational component) can determine the loads on the blades that caused the deflection detected by the sensors. With this information, the turbine controller perform condition-based monitoring analysis to provide, for example, fatigue assessment, failure trending and/or component diagnostics.

Figure 2:
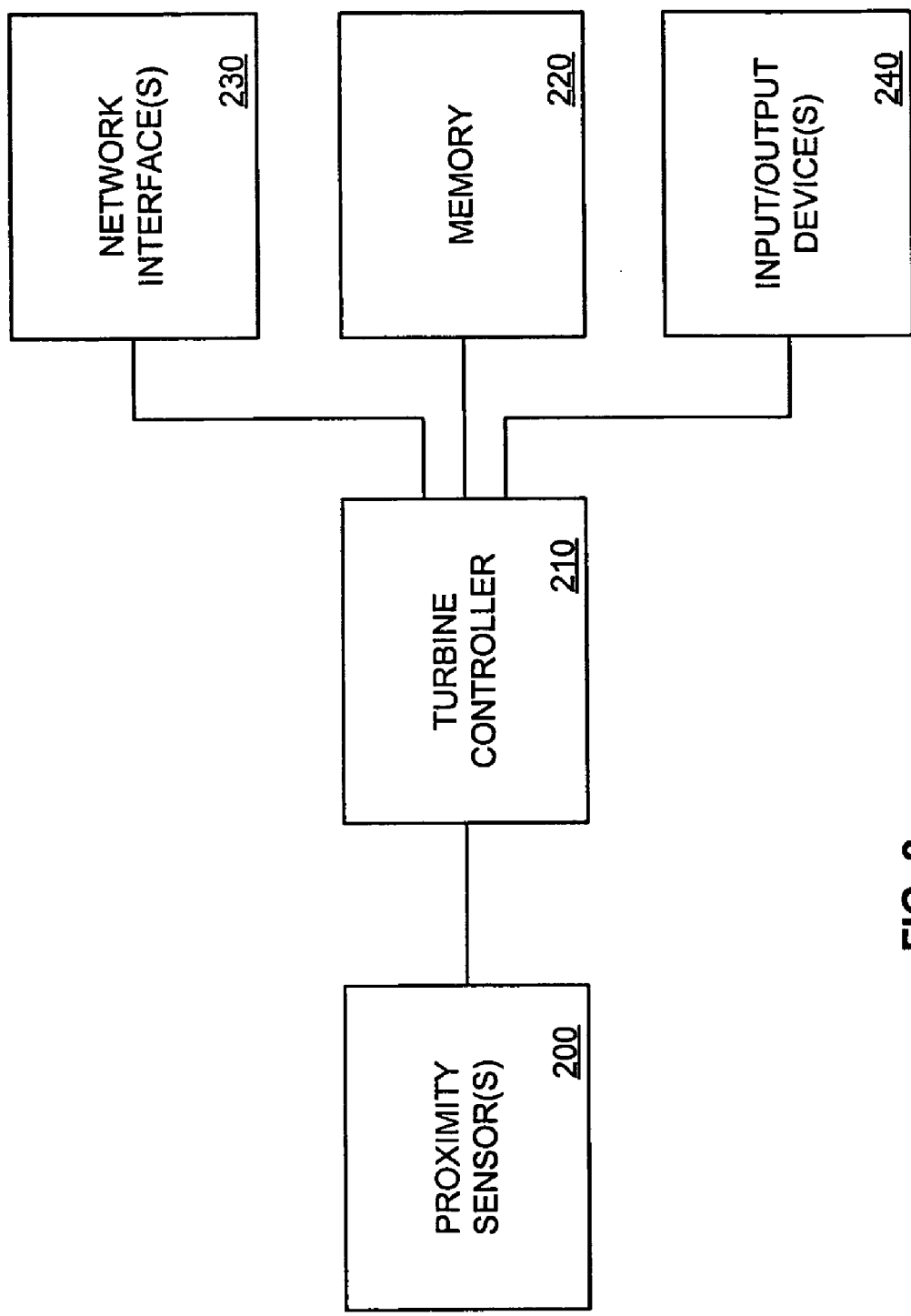
FIG. 2 is a block diagram of one embodiment of a wind turbine control system.

FIG. 2 is a block diagram of one embodiment of a wind turbine control system. Proximity sensors 200 generate signals in response to displacement of wind turbine components, for example, the main shaft. Turbine controller 210 is coupled to sensors 200 to receive the signals generated by sensors 200.

In one embodiment, turbine controller 210 includes a processor that receives output signals (either analog or digital signals) from sensors 200. The processor can be, for example, a general purpose processor that executes instructions stored in memory 220, a hardwired control circuit, or a combination of a general purpose processor and hardwired circuitry.

Output signals from proximity sensors 200 can be used by turbine controller 210 to perform CBM operations, for example, prognostic and life trending analysis of the wind turbine drive train. In one embodiment, in addition to providing the basis for CBM functionality, the proximity sensors can be used for load mitigation purposes. The blade pitch change to reduce the load and thereby reduce fatigue and loading on various turbine components can be determined by a turbine controller from the output signals generated by the sensors. A Parks DQ transformation, a bias estimation method calculation and/or other control techniques can be used to calculate the pitch increment for each rotor blade to reduce overall and/or asymmetric rotor loading.

Turbine controller 210 can also be coupled with other components, for example, network interface(s) 230 and input/output device(s) 240. Network interface(s) 230 provide an interface for turbine controller 210 to communicate with remote devices, for example, a wind farm control system. Input/output device(s) 240 allow interaction with local devices, for example, a keypad, a keyboard and/or a display device.

In one embodiment, main shaft displacement is determined by analysis of signals from proximity sensors 200 measuring displacement of the shaft using sensor technologies based on acoustic, optical, magnetic, eddy current, capacitive or inductive field or other technology. In one embodiment, proximity sensors are used to measure displacement relative to a low deflection reference frame, for example, a main frame or housing of the low speed shaft main bearing. The signals from proximity sensors 200 are processed according to analysis techniques described below by turbine controller 210 to provide CBM functionality.

Figure 4:
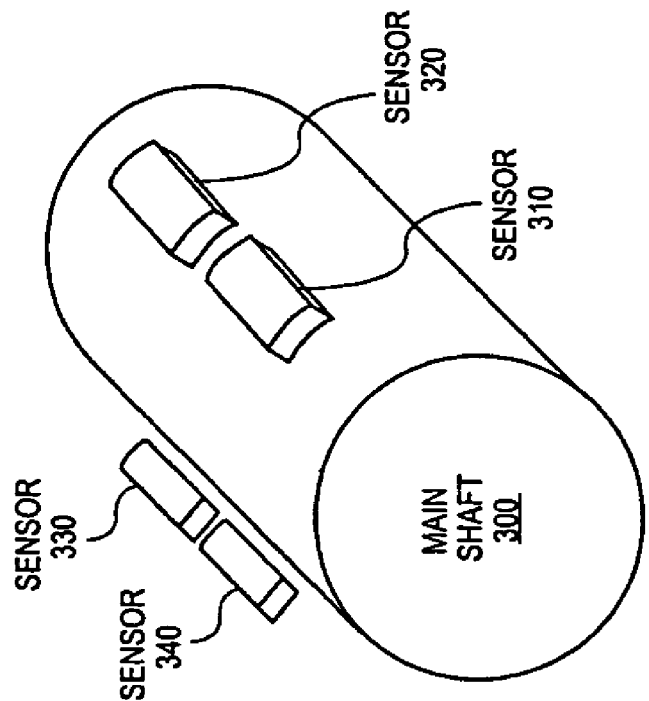
FIG. 4 is a perspective view of a main shaft having four sensors in a second configuration.
Figure 3:
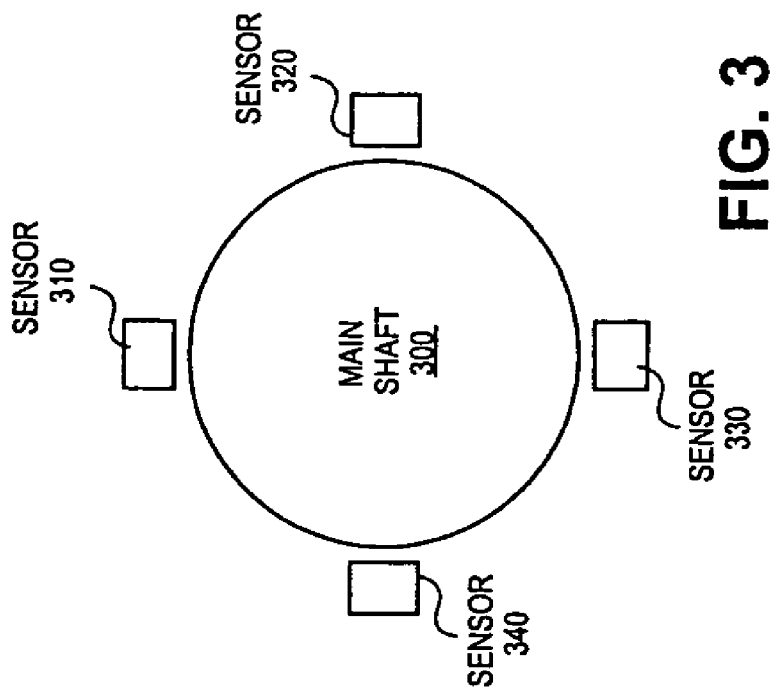
FIG. 3 is an end view of a main shaft having four sensors in a first configuration.
Figure 5:
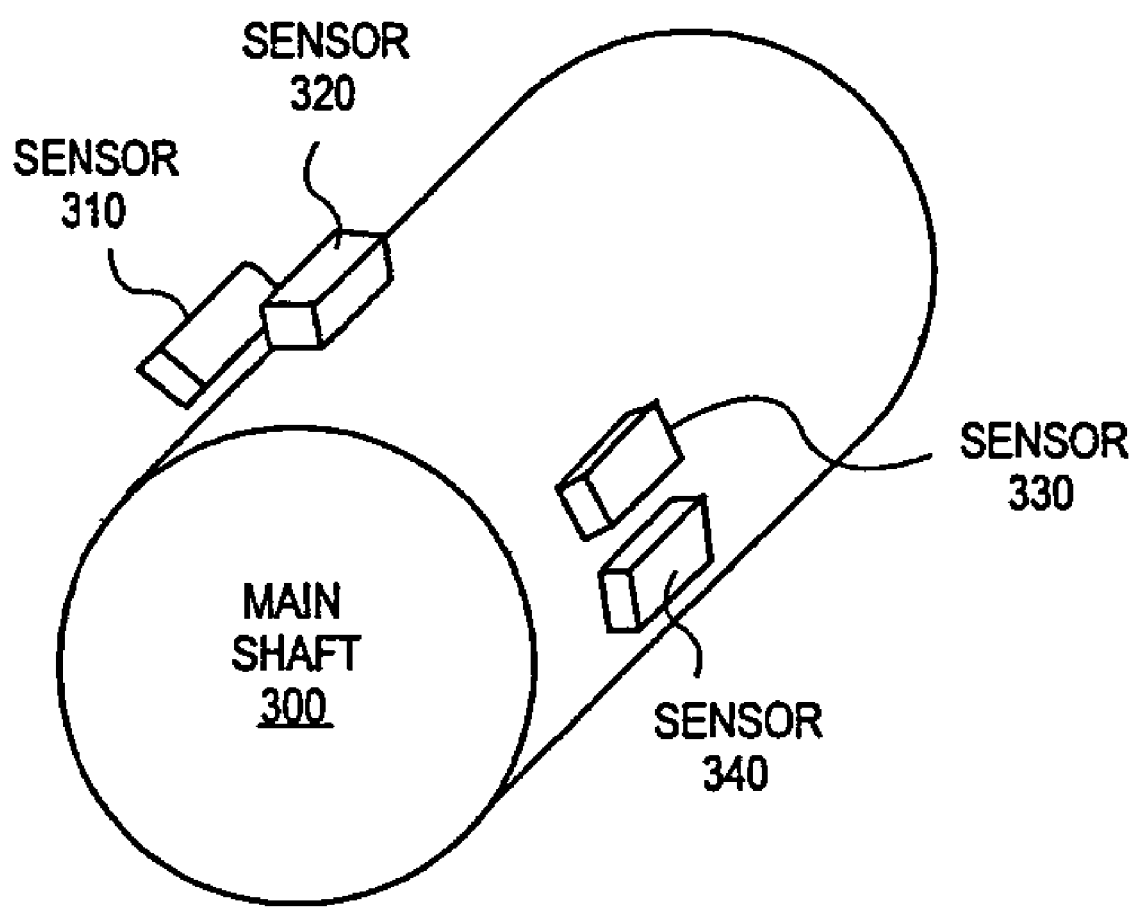
FIG. 5 is a perspective view of a main shaft having four sensors in a third configuration.

A minimum of two sensors are used to measure main shaft displacement; however, for redundancy, sensor diagnostic purposes, or other reasons, more than two sensors can be used. FIG. 3 illustrates an embodiment with four sensors with each sensor (310, 320, 330 and 340) positioned 90° apart around the circumference of the surface of main shaft 300. FIG. 4 illustrates an embodiment with four sensors positioned in pairs located 90° apart around main shaft 300. FIG. 5 illustrates an alternate embodiment with four sensors positioned in pairs located 90° apart around main shaft 300. In one embodiment, the sensors are located as far as possible from the gearbox. In an alternate embodiment, the sensors are located approximately midway between the gearbox and the main bearing. Other sensor locations can also be used.

Figure 6:
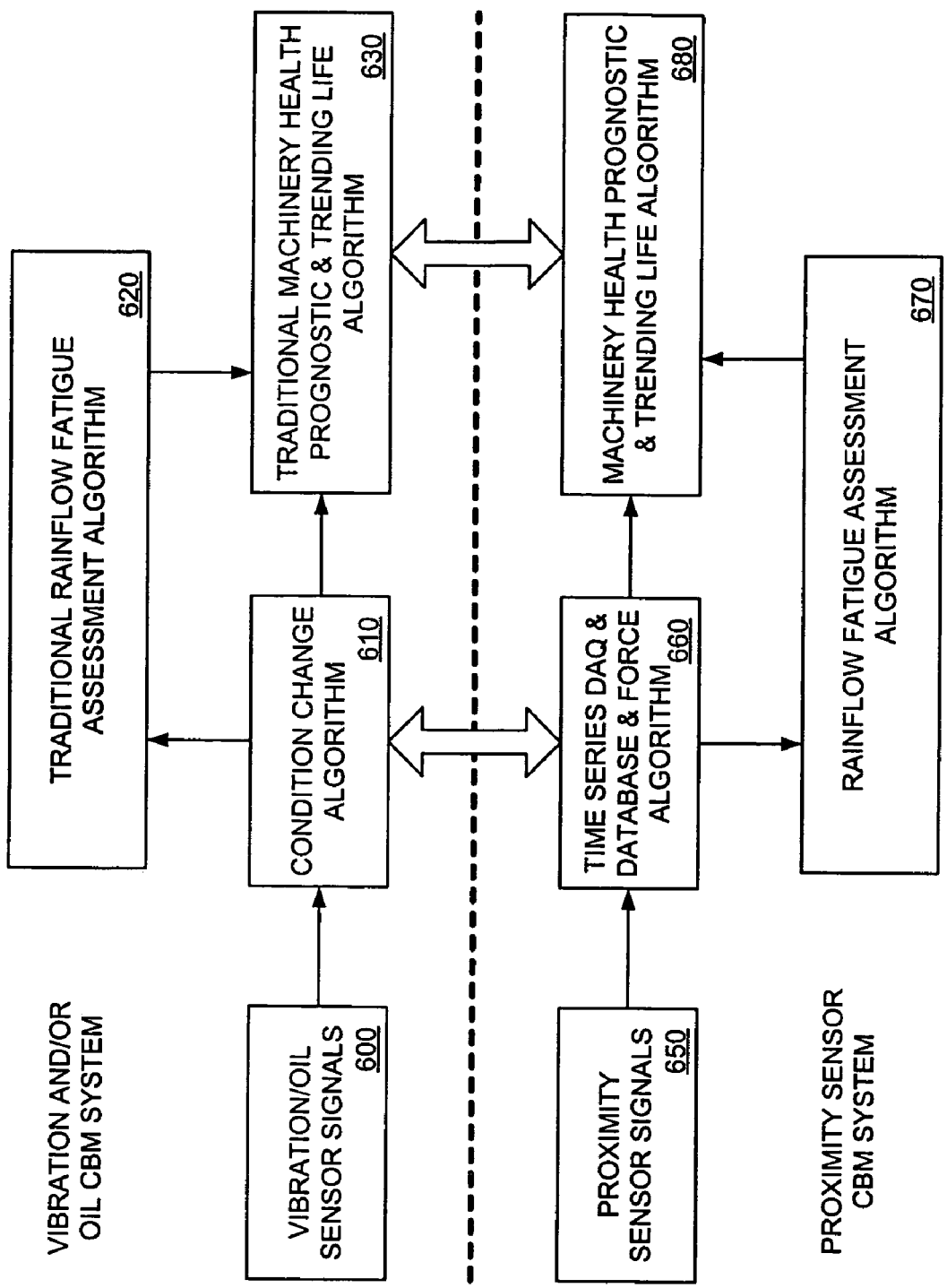
FIG. 6 is a diagram of one embodiment of a technique for correlation of a condition-based monitoring technique using proximity sensors with condition-based monitoring techniques using vibration and/or oil analysis.

FIG. 6 is a diagram of one embodiment of a technique for correlation of a condition-based monitoring technique using proximity sensors with condition-based monitoring techniques using vibration and/or oil analysis. The diagram of FIG. 6 includes various algorithms, which can be performed by software, hardware, or any combination of hardware and software. That is, a proximity sensor based CBM system can be correlated to previously established condition predictors.

The process of FIG. 6 can be performed using a single wind turbine having redundant CBM systems (i.e., a vibration and/or oil based system and a proximity sensor based system) with the resulting correlated being used in wind turbines having only proximity sensor based CBM systems. Because the proximity sensor systems described herein can be used as the basis of control for multiple wind turbine components, the resulting proximity based CBM system can be less costly than the multiple systems it replaces.

Vibration and/or oil based sensor signals 600 are used to determine the condition of one or more wind turbine components. The vibration and/or oil based signals can be generated by any type of CBM sensors known in the art. The signals from the vibration and/or oil based CBM system are processed according to condition change algorithm 610. Any condition change algorithm known in the art that corresponds to sensor signals 600 can be used.

Results form condition change algorithm 610 are processed according to rainflow fatigue assessment algorithm 620 and machinery health prognostic and trending life algorithm 630. Rainflow fatigue assessment algorithm uses data generated by condition change algorithm 610 to determine the fatigue experienced by wind turbine components in response to changing conditions. Rainflow fatigue assessment is known in the art and any appropriate algorithm can be used.

Results generated by condition change algorithm 610 and rainflow fatigue assessment algorithm 620 are processed by machinery health prognostic and trending life algorithm 630, which generates an estimation of remaining service time for the corresponding component(s). The combination of sensors that provide vibration/oil sensor signals 600 and the computational components that implement condition change algorithm 610, rainflow fatigue assessment algorithm 620 and machinery health prognostic and trending life algorithm 630 as well as any associated input/output devices collectively provide a vibration and/or oil CBM system.

Proximity sensor signals 650 provide signals that indicate movement of a wind turbine component, for example, a main shaft flange. Proximity sensor signals 650 are processed by time series data acquisition and database components that, in one embodiment, apply a force algorithm to the acquired data. In one embodiment, the results from condition change algorithm 610 are correlated with the data stored in database 660 to determine load conditions (as determined by proximity sensors) that result in condition changes (as determined by condition change algorithm 610). The load conditions can be individual load conditions (e.g., a gust) or the load conditions can be historical (e.g., multiple brake applications). In one embodiment, the force algorithm performs the correlation operation.

In one embodiment, data generated by the force algorithm is processed according to rainflow fatigue assessment algorithm 670. In one embodiment, the data generated by the force algorithm is comparable to the data generated by condition change algorithm 610 so that rainflow fatigue assessment algorithm 670 is similar to (or the same as) rainflow fatigue assessment algorithm 620. Alternatively, rainflow fatigue assessment algorithm 670 is designed to provide a rainflow or similar analysis on data generated by the force algorithm in a format that is unique to the components of the proximity sensor CBM system.

Data generated by the force algorithm and by rainflow fatigue assessment algorithm 670 are processed according to machinery health prognostic and trending life algorithm (trending algorithm) 680. In one embodiment, trending algorithm 680 determines whether a monitored component is operating properly, determines whether the monitored component has a remaining service life and/or estimates the remaining service life for the monitored component. The combination of sensors that provide proximity sensor signals 650 and the computational components that implement algorithms 660, 670 and 680 as well as any associated input/output devices collectively provide a proximity sensor CBM system.

Using the components and algorithms of the proximity sensor CBM system described with respect to FIG. 6, the movement of one or more components along with other conditions related to the movement of the components (e.g., wind speed and direction, temperature, wind turbine brake applications) can be monitored and the corresponding data can be used to provide a CBM system with sensors that are used for multiple purposes in the turbine control system, which provides a more efficient and less costly turbine control system as compared to a wind turbine having separate sensor systems for control and for CBM purposes.

Figure 7:
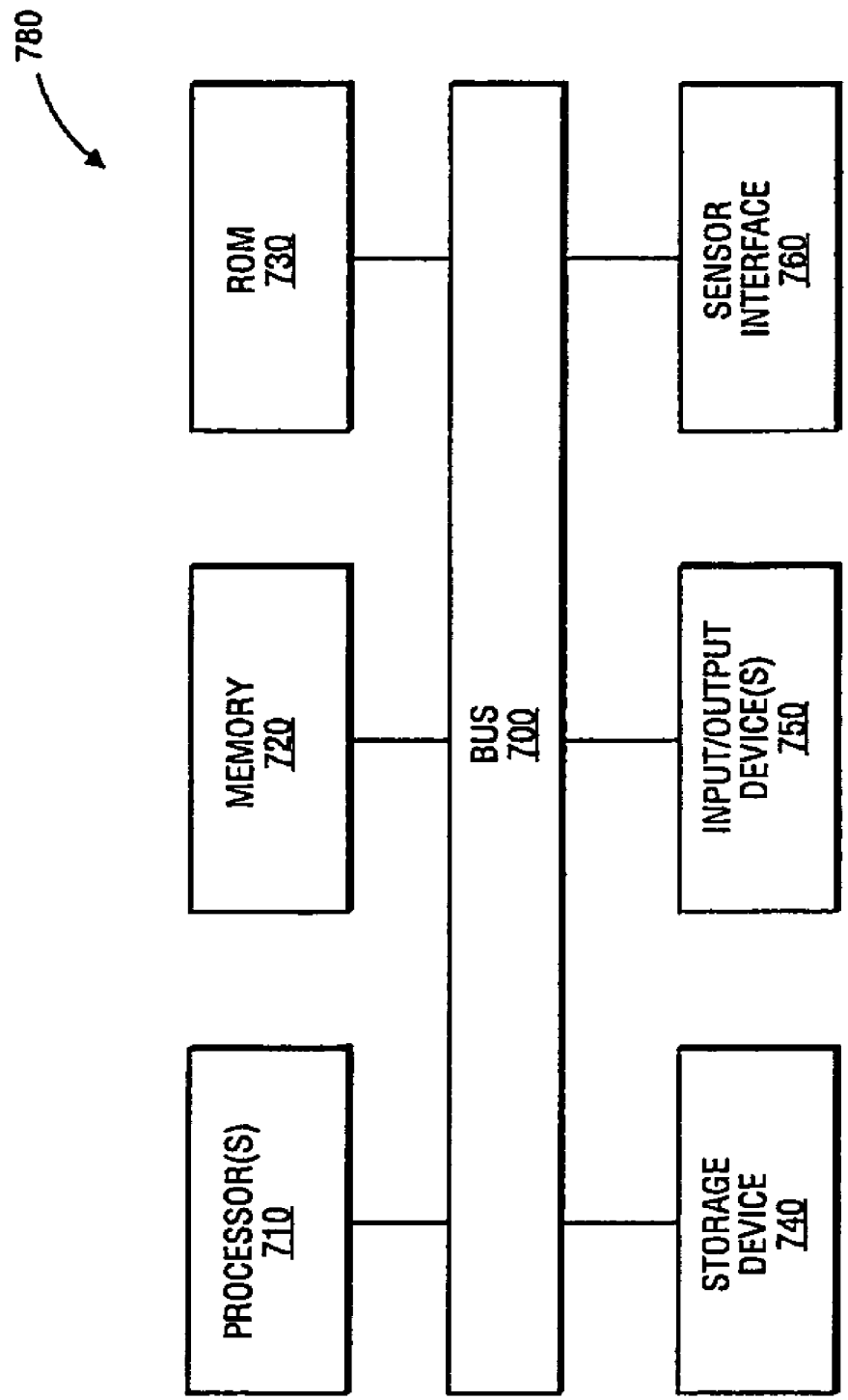
FIG. 7 is a block diagram of one embodiment of a turbine controller.

FIG. 7 is a block diagram of one embodiment of a turbine controller that can be used to implement the algorithms discussed above. Turbine controller 780 includes bus 700 or other communication device to communicate information, and processor 710 coupled to bus 700 to process information. While turbine controller 780 is illustrated with a single processor, turbine controller 780 can include multiple processors and/or co-processors. Turbine controller 780 further includes random access memory (RAM) or other dynamic storage device 720 (referred to as memory), coupled to bus 700 to store information and instructions to be executed by processor 710. Memory 720 also can be used to store temporary variables or other intermediate information during execution of instructions by processor 710.

Turbine controller 780 can also include read only memory (ROM) and/or other static storage device 730 coupled to bus 700 to store static information and instructions for processor 710. Data storage device 740 is coupled to bus 700 to store information and instructions. Input/output device(s) 750 can include any device known in the art to provide input data to turbine controller 780 and/or receive output data from turbine controller 780.

Instructions are provided to memory from a storage device, such as magnetic disk, a read-only memory (ROM) integrated circuit, CD-ROM, DVD, via a remote connection that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Sensor interface 760 is an interface that allows turbine controller 780 to communicate with one or more sensors within a wind turbine. For example, sensor interface 760 can be coupled to receive output signals from one or more sensors that detect deflection or loading of wind turbine components as described. Sensor interface 760 can be, for example, an analog-to-digital converter that converts an analog voltage signal generated by the sensors to a multi-bit digital signal to be used by processor(s) 710.

Processor(s) 710 can then perform the CBM algorithms (e.g., rainflow fatigue assessment algorithm, machinery health prognostic and trending algorithm) as well as correlation operations using the data from the sensors. Processor(s) 710 can also analyze the data and transmit data to a blade pitch controller through input/output device(s) 750 to cause the blade pitch controller to change the pitch of one or more blades of the wind turbine. Processor(s) 710 can take other actions in response to the signals from the sensors. For example, processor(s) 710 can cause a brake to be applied to stop or slow rotation of the hub or of a rotating shaft.

In one embodiment, in addition to the CBM functions described above one or more of the following analysis operations can be performed by the turbine controller. In one embodiment, yaw motion and position are monitored by proximity sensors mounted in a position to count yaw system gear teeth. Alternatively, an encoder attached to the yaw system can monitor yaw motion and position. One or more of the following conditions of the yaw system can be monitored for CBM purposes: the number of starts and stops of yaw system movement, the duty time of system operation, the time in specific fixed position and corresponding wind conditions (this could cause damage to portions of the slew gear—this can be correlated to the wind rose), yaw operation under full or partial loads caused by brake applications, loads under operation (yaw operation during operation induces large gyroscopic loads that may limit yaw system life), and duration of time for yaw positions (continuously loading a bearing in a static position may degrade the bearing faster then when the bearing is rotating).

One or more of the characteristics described above can be used for CBM purposes to track or predict the condition of yaw system components. These characteristics can be monitored to correlated to component condition, for example, as described with respect to FIG. 6 above.

In one embodiment, the CBM system provides predictive trending for the wind turbine pitch system components. In one embodiment, monitoring of the pitch system is provided by pitch motor encoders. In an alternate embodiment, proximity sensors can be mounted to count gear teeth of one or more blade pitch motors.

One or more of the following conditions of the blade pitch system can be monitored for CBM purposes: the number of starts and stops of blade pitch system movement, the duty time of system operation, the time in specific fixed position and corresponding wind conditions, blade pitch operation under full or partial loads caused by brake applications, and duration of time for blade pitch positions.

Predictive trending operations for the blade pitch system can also be based on sensors monitoring non-blade pitch system components. For example, shaft flange sensors can be used to determine loads applied to the blades, which can be used to determine blade bending moments. The blade bending moment information can be used to for predictive trending of the blade pitch system. Other predictive trending analyses can be performed using one or more of the sensors described herein. For example, the number of revolutions and/or the speed of the revolutions of a turbine shaft (e.g., a low-speed shaft, a high-speed shaft) can be used for CBM analysis for drive train components and/or generator brushes.

Figure 8:
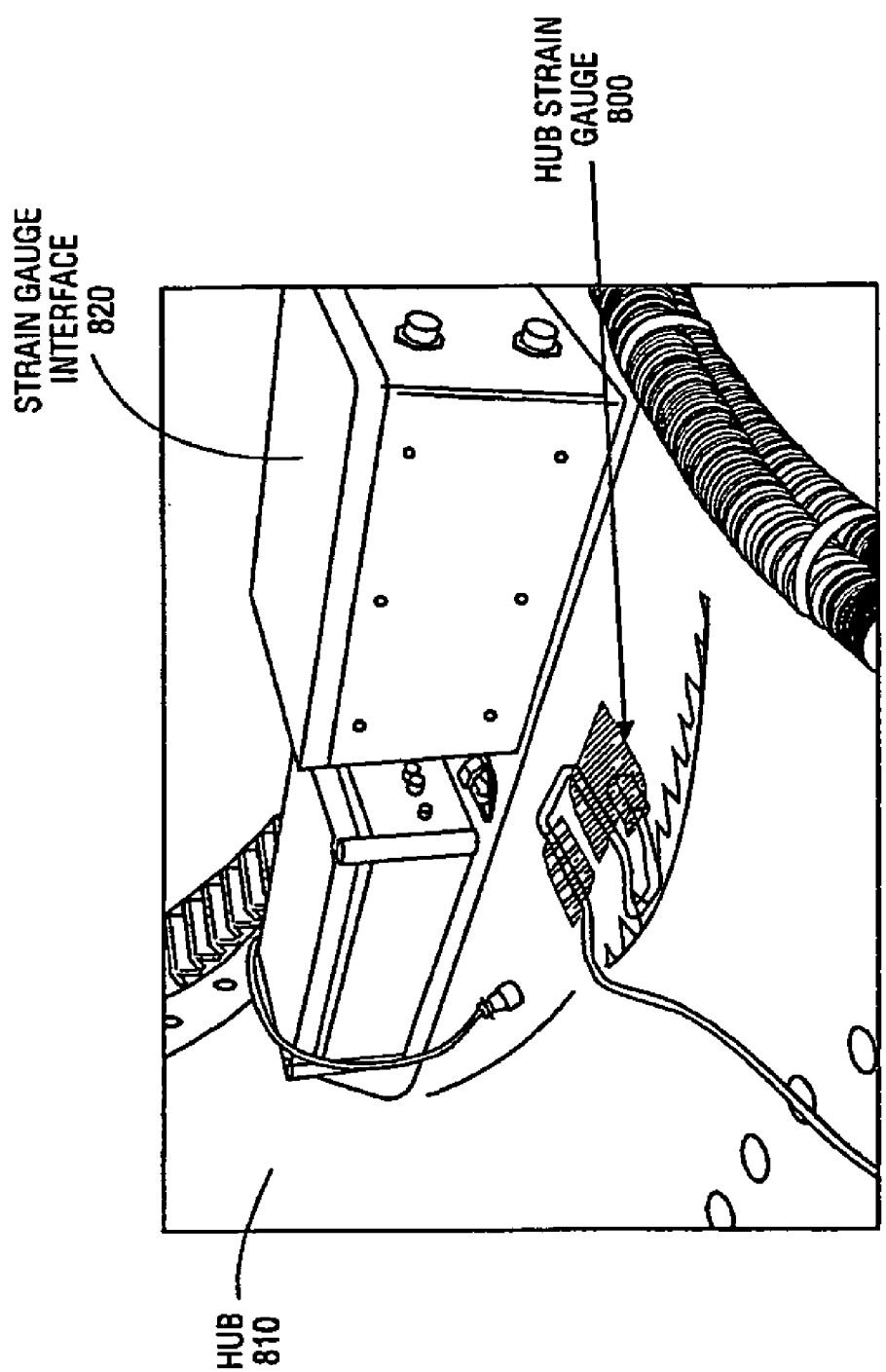
FIG. 8 illustrates one embodiment of a hub having a strain gauge.

The description that follows provides several examples of different sensors and/or sensor positions. The sensors of FIGS. 8-12 can be used for CBM purposes. FIG. 8 illustrates one embodiment of a hub having a strain gauge. In one embodiment, as illustrated in FIG. 8, quarter bridge welded strain gauge (e.g., 800) are located inside hub 810, near the pitch bearing, and adjacent to the nacelle. One strain gauge is used for each of three axes. Other locations and/or a different number of strain gauges can also be used. In one embodiment, data logger 820 is also located inside of hub 810 and is configured to acquire data from the strain gauge(s).

Figure 9:
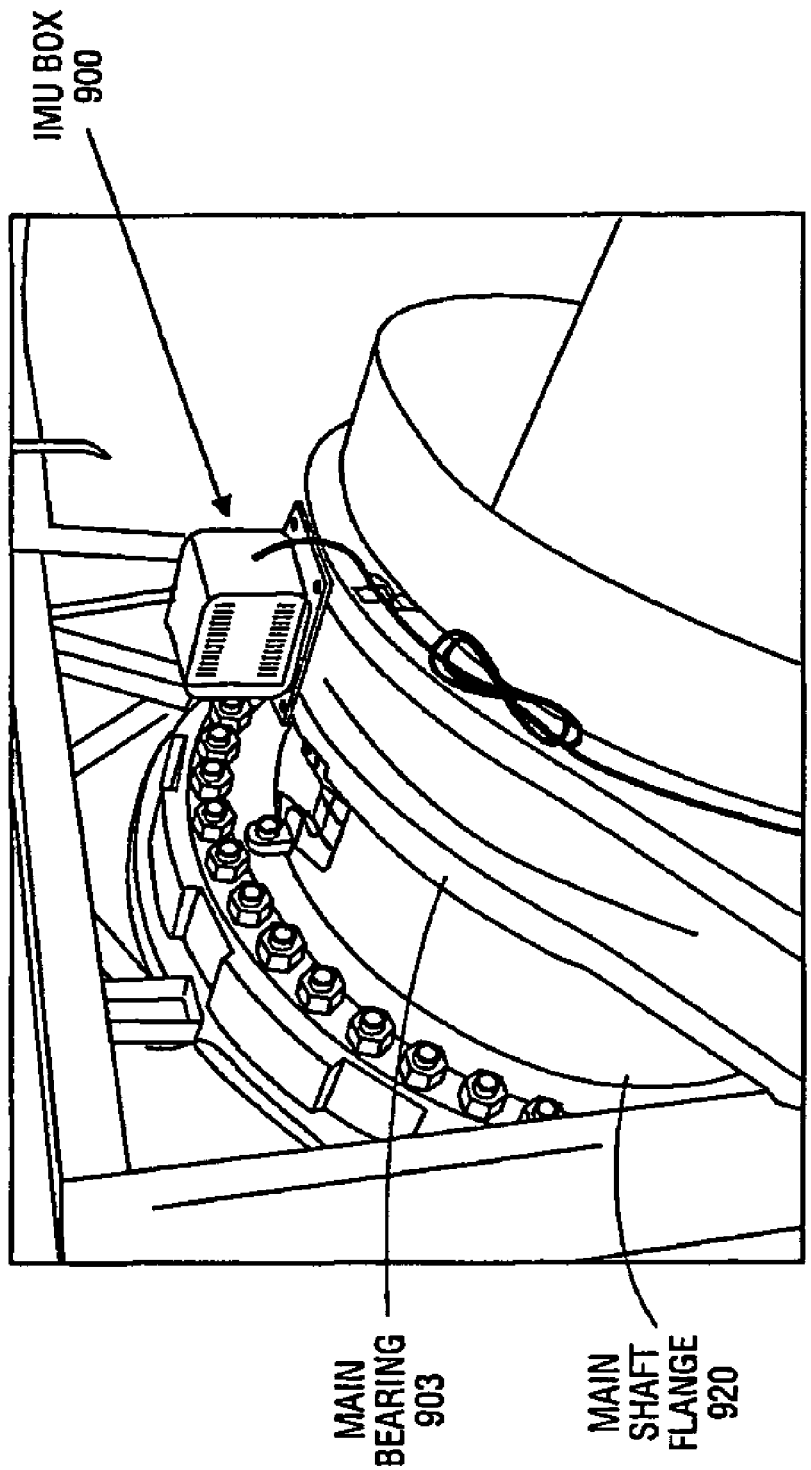
FIG. 9 illustrates one embodiment of a wind turbine having an inertial measurement unit (IMU).

FIG. 9 illustrates one embodiment of a wind turbine having an inertial measurement unit (IMU). In one embodiment, IMU 900 is connected to main bearing 903. IMU 900 is a gyroscope and accelerometer-based device that provides measurement of roll, pitch and yaw angles, and three axis accelerations. IMU 900 is coupled to a turbine controller that determines loads based on IMU measurements.

Figure 10:
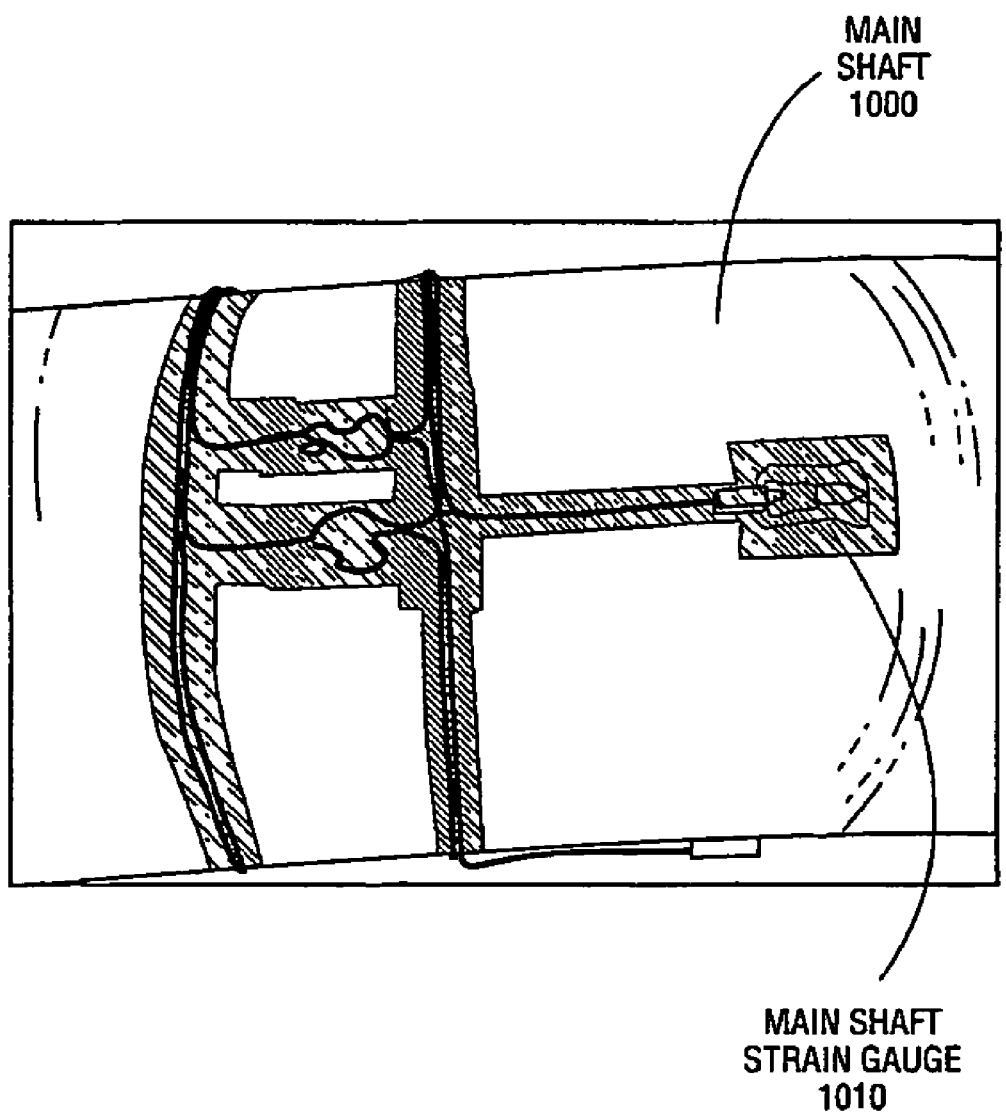
FIG. 10 illustrates one embodiment of strain gauges attached to the main shaft.

FIG. 10 illustrates one embodiment of strain gauges attached to the main shaft. In one embodiment, the main shaft is instrumented with weldable strain gauges at 0°, 45° and 90° azimuth. Zero degrees azimuth is defined as blade number one positioned vertically. Alternate positions can also be used for the main shaft strain gauges, for example, strain gauges can be positioned within one or more T-bolts. The main shaft strain gauges are coupled to the turbine controller, which analyzes the data provided by the main shaft strain gauges to determine loads placed on the main shaft and determines whether to change the pitch of the rotor blades.

Figure 11:
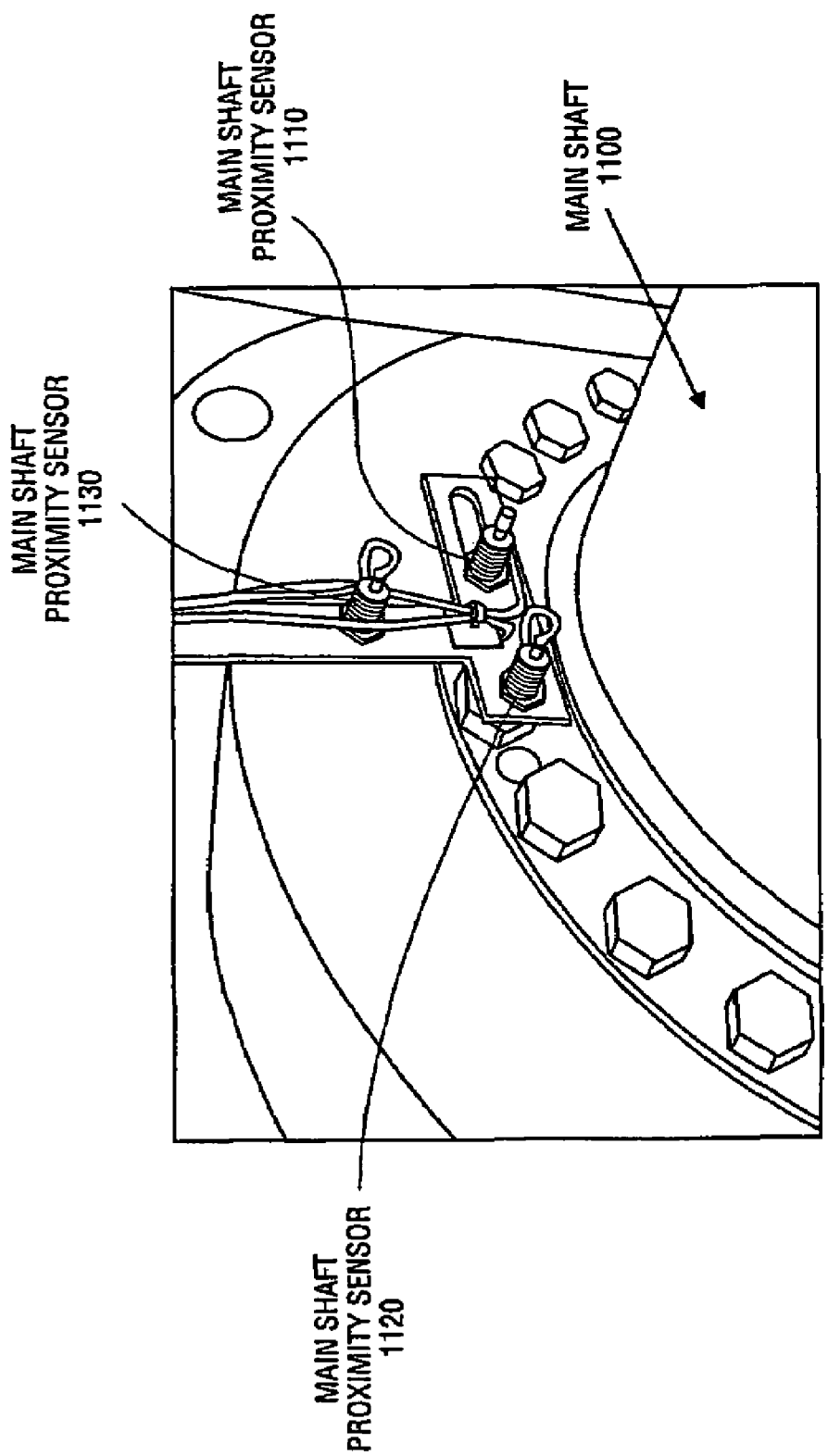
FIG. 11 illustrates one embodiment of proximity sensors attached to the main shaft.

FIG. 11 illustrates one embodiment of proximity sensors attached to the a fixed frame, such as the bedplate, and facing the main shaft. In one embodiment main shaft proximity sensors (e.g., 1110, 1120, 1130) are located adjacent to the gearbox. Sensors 1110 and 1120 may be used to detect rotational rate and sensor 1130 may be used to detect blade azimuth position. Alternate sensor positions can also be used. For example, proximity sensors can be attached to the blades.

Figure 12:
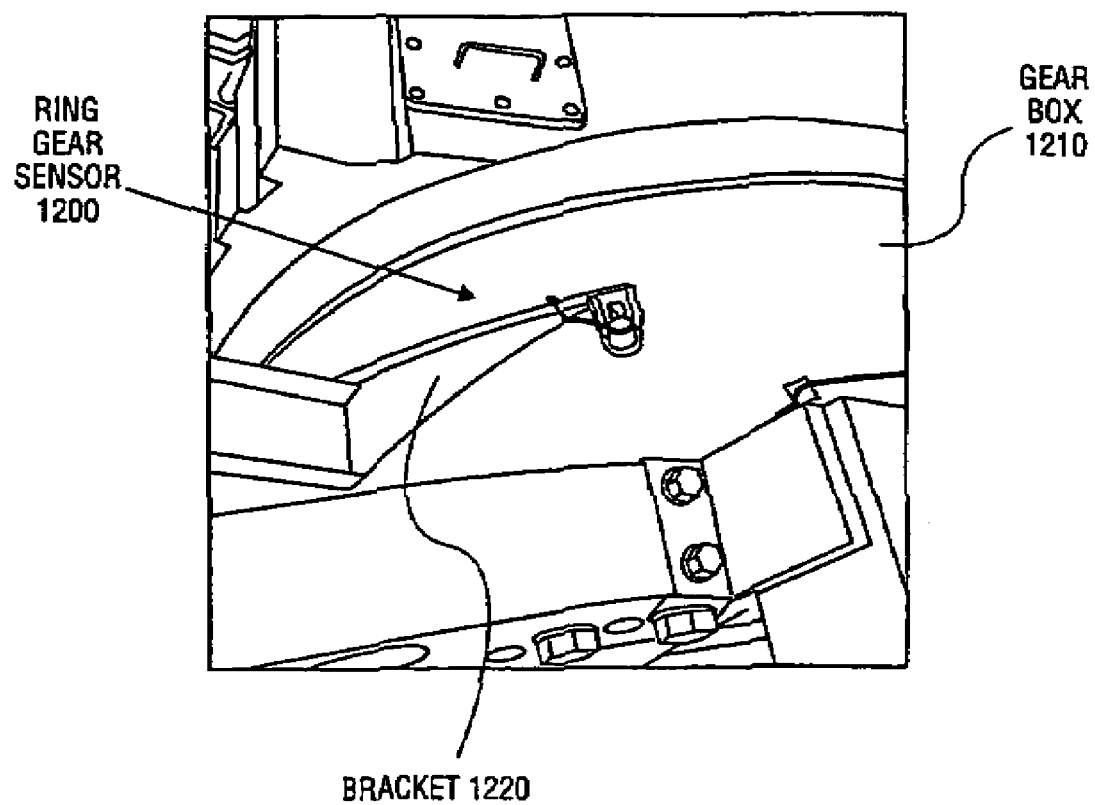
FIG. 12 illustrates one embodiment of ring gear sensor to measure the displacement of gear box relative to the bedplate.

FIG. 12 illustrates one embodiment of ring gear sensor 1200 to measure the displacement of gear box 1210, relative to the bedplate. Support bracket 1220 is connected to the bedplate (not shown in FIG. 12) and positions the sensor adjacent to gear box 1210. Thus, ring gear sensor 1200 detects deflection of gear box 1210 with respect to the bedplate. In one embodiment, ring gear proximity sensors are located at 90° with respect to each other along the perimeter of the gear box ring gear.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A wind turbine comprising:
   a sensor coupled to detect movement of a wind turbine component from a base position and to generate one or more signals indicating the movement; and
   a control circuit coupled with the sensor to receive the one or more signals indicating the movement, to perform a condition-based monitoring operation based on the one or more signals and to selectively generate an output signal based on the condition-based monitoring operation, wherein the condition based monitoring operation comprises at least rainflow fatigue assessment.

2. The wind turbine of claim 1 wherein the selectively generated output signal comprises providing a visual representation of an estimated remaining service life for the component.

3. The wind turbine of claim 1 wherein the sensor comprises at least one of: a proximity sensor to detect movement of a main shaft flange, a set of proximity sensors facing the shaft to detect displacement of the shaft with respect to a relatively non-deflecting component, two proximity sensors facing the shaft, and further wherein the two sensors are approximately 90° apart with respect to a cross-sectional axis of the shaft, four proximity sensors facing the shaft, and further wherein the four sensors are approximately 90° apart with respect to the axis of the shaft, and two pairs of proximity sensors facing the shaft, and further wherein the two pairs of sensors are approximately 90° apart with respect to a cross-sectional axis of the shaft.

4. The wind turbine of claim 1 wherein the sensor comprises at least one of: an accelerometer connected to a bedplate, a proximity sensor connected to a reference frame and to a gearbox to measure displacement of the gearbox, a proximity sensor to detect rotor blade azimuth and rotational speed, a proximity sensor connected to a reference frame and to a gearbox ring-gear to measure displacement of the gearbox ring-gear, a strain gauge attached to a hub, a proximity sensor connected to a rotor blade, and a strain gauge disposed within a T-bolt.

5. The wind turbine of claim 1 further comprising a blade pitch control circuit coupled with the sensor to mitigate a load causing the movement of the component in response to the one or more signals from the sensor.

6. The wind turbine of claim 5 wherein the blade pitch control circuit mitigates bending loads on the shaft by controlling pitch of one or more wind turbine blades.

7. A method comprising:
receiving signals from a sensor indicating movement of a wind turbine component;
performing condition-based monitoring analysis of the wind turbine component using the sensor signals, wherein the condition based monitoring operation comprises at least rainflow fatigue assessment; and
generating an output indicating results of the condition-based monitoring analysis.

8. The method of claim 7 wherein condition-based monitoring analysis further comprises performing one or more of: fatigue assessment, failure trending and diagnostic analysis.

9. The method of claim 7 wherein the condition-based monitoring analysis comprises rainflow fatigue assessment and/or component service life trending analysis.

10. The method of claim 7 further comprising:
determining a load placed on the wind turbine based on the signals from the one or more sensors; and
causing one or more blades of the wind turbine to change pitch based on the determined load.

11. The method of claim 7 wherein generating an output indicating results of the condition-based monitoring analysis comprises selectively providing a visual representation of an estimated remaining service life for the component.

12. The method of claim 7 wherein the sensor comprises at least one of: a proximity sensor to detect movement of a main shaft flange, a set of proximity sensors facing the shaft to detect displacement of the shaft with respect to a relatively non-deflecting component, two proximity sensors facing the shaft, and further wherein the two sensors are approximately 90° apart with respect to a cross-sectional axis of the shaft, four proximity sensors facing the shaft, and further wherein the four sensors are approximately 90° apart with respect to the axis of the shaft, and two pairs of proximity sensors facing the shaft, and further wherein the two pairs of sensors are approximately 90° apart with respect to a cross-sectional axis of the shaft.

13. The method of claim 7 wherein the sensor comprises at least one of: an accelerometer connected to a bedplate, a proximity sensor connected to a reference frame and to a gearbox to measure displacement of the gearbox, a proximity sensor to detect rotor blade azimuth and rotational speed, a proximity sensor connected to a reference frame to measure displacement of the gearbox ring-gear, a strain gauge attached to a hub, a proximity sensor connected to a rotor blade, and a strain gauge disposed within a T-bolt.

14. An article comprising a computer-readable medium having stored thereon instructions that, when executed, cause one or more processors to:
receive signals from a sensor indicating movement of a wind turbine component;
perform condition-based monitoring analysis of the wind turbine component using the sensor signals, wherein the condition based monitoring operation comprises at least rainflow fatigue assessment; and
generate an output indicating results of the condition-based monitoring analysis.

15. The article of claim 14 wherein the instructions that cause the one or more processors to perform condition-based monitoring analysis comprise instructions that, when executed, cause the one or more processors to perform one or more of: fatigue assessment operations, failure trending operations and diagnostic analysis operations.

16. The article of claim 14 wherein the instructions that cause the one or more processors to perform condition-based monitoring analysis comprise instructions that, when executed, cause the one or more processors to perform rainflow fatigue assessment operations and/or component service life trending analysis operations.

17. The article of claim 14 further comprising instructions that, when executed, cause the one or more processors to:
determine a load placed on the wind turbine based on the signals from the one or more sensors; and
cause one or more blades of the wind turbine to change pitch based on the determined load.

18. The article of claim 14 wherein the instructions that cause the one or more processors to generate an output indicating results of the condition-based monitoring analysis comprise instructions that, when executed, cause the one or more processors to selectively provide a visual representation of an estimated remaining service life for the component.

19. The article of claim 14 wherein the sensor comprises at least one of: a proximity sensor to detect movement of a main shaft flange, a set of proximity sensors facing the shaft to detect displacement of the shaft with respect to a relatively non-deflecting component, two proximity sensors facing the shaft, and further wherein the two sensors are approximately 90° apart with respect to a cross-sectional axis of the shaft, four proximity sensors facing the shaft, and further wherein the four sensors are approximately 90° apart with respect to the axis of the shaft, and two pairs of proximity sensors facing the shaft, and further wherein the two pairs of sensors are approximately 90° apart with respect to a cross-sectional axis of the shaft.

20. The article of claim 14 wherein the sensor comprises at least one of: an accelerometer connected to a bedplate, a proximity sensor connected to a reference frame and to a gearbox to measure displacement of the gearbox, a proximity sensor to detect rotor blade azimuth and rotational speed, a proximity sensor connected to a reference frame and to a gearbox ring-gear to measure displacement of the gearbox ring-gear, a strain gauge attached to a hub, a proximity sensor connected to a rotor blade, and a strain gauge disposed within a T-bolt.

* * * * *